(12) United States Patent
Haruki

(10) Patent No.: US 7,664,262 B2
(45) Date of Patent: Feb. 16, 2010

(54) PLAYBACK APPARATUS AND PLAYBACK CONTROL METHOD

(75) Inventor: Kosuke Haruki, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/240,668

(22) Filed: Sep. 29, 2008

(65) Prior Publication Data

US 2009/0097644 A1   Apr. 16, 2009

(30) Foreign Application Priority Data

Oct. 10, 2007  (JP)  ............... 2007-264661
Feb. 15, 2008  (JP)  ............... 2008-035267

(51) Int. Cl.
  *G06F 7/04*    (2006.01)
  *G06F 17/30*   (2006.01)
  *H04L 9/32*    (2006.01)
  *H04L 29/06*   (2006.01)
  *H04N 7/167*   (2006.01)
  *H04K 1/00*    (2006.01)
  *H04L 9/00*    (2006.01)
  *H04N 7/16*    (2006.01)

(52) U.S. Cl. ................... 380/200; 726/2; 726/27; 713/150; 380/255; 380/277; 725/25

(58) Field of Classification Search ............ None
See application file for complete search history.

(56) References Cited

U.S. PATENT DOCUMENTS

2005/0144646 A1* 6/2005 Lecrom et al. ............ 725/100
2005/0289139 A1* 12/2005 Takashima et al. ......... 707/5
2006/0039254 A1    2/2006 Hirasawa
2007/0162978 A1* 7/2007 Watanabe et al. .......... 726/27

FOREIGN PATENT DOCUMENTS

| JP | 2000-122539 A | 4/2000 |
| JP | 3162046 B2 | 2/2001 |
| JP | 2005-250567 A | 9/2005 |
| JP | 2007-68111 A | 3/2007 |
| JP | 2007-200481 A | 8/2007 |

* cited by examiner

*Primary Examiner*—Nasser G Moazzami
*Assistant Examiner*—Oscar A Louie
(74) *Attorney, Agent, or Firm*—Knobbe, Martens, Olson & Bear LLP

(57) ABSTRACT

According to one embodiment, there is provided a playback apparatus which plays back content including an encrypted video object and an encrypted resource file, including a memory including a file cache area, a module configured to decrypt the video object, a playback process module configured to play back the decrypted video object and to output a resource file acquisition request, a module configured to determine whether the resource file is decrypted, to decrypt the resource file, to write the decrypted resource file over the encrypted resource file, to update the management information, and to send the decrypted resource file to the playback process module, and a module configured to determine whether the resource file is decrypted, to encrypt the decrypted resource file, to write the encrypted resource file over the decrypted resource file, to update the management information, and to send the encrypted resource file to the storage.

5 Claims, 9 Drawing Sheets

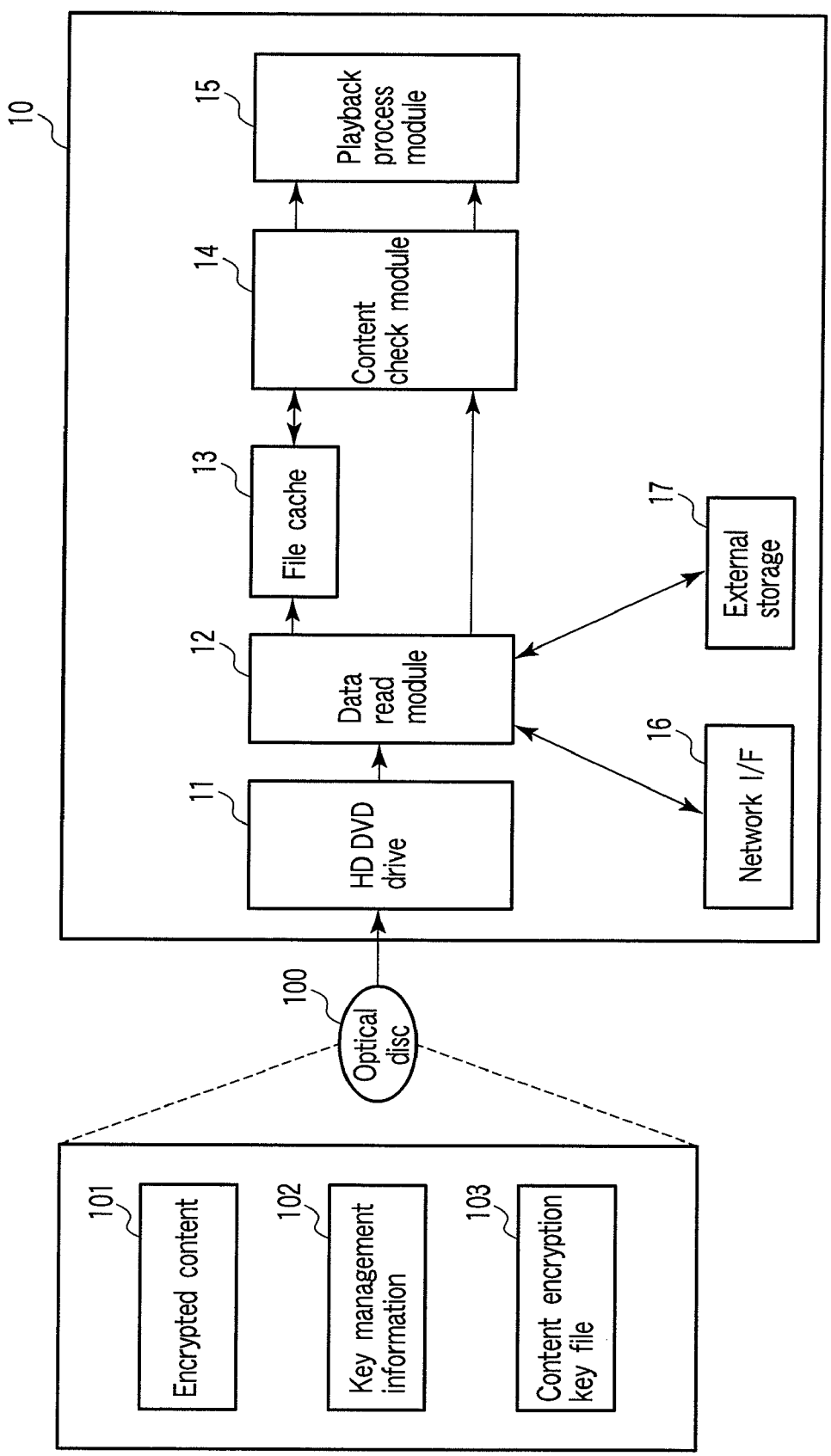
F I G. 1

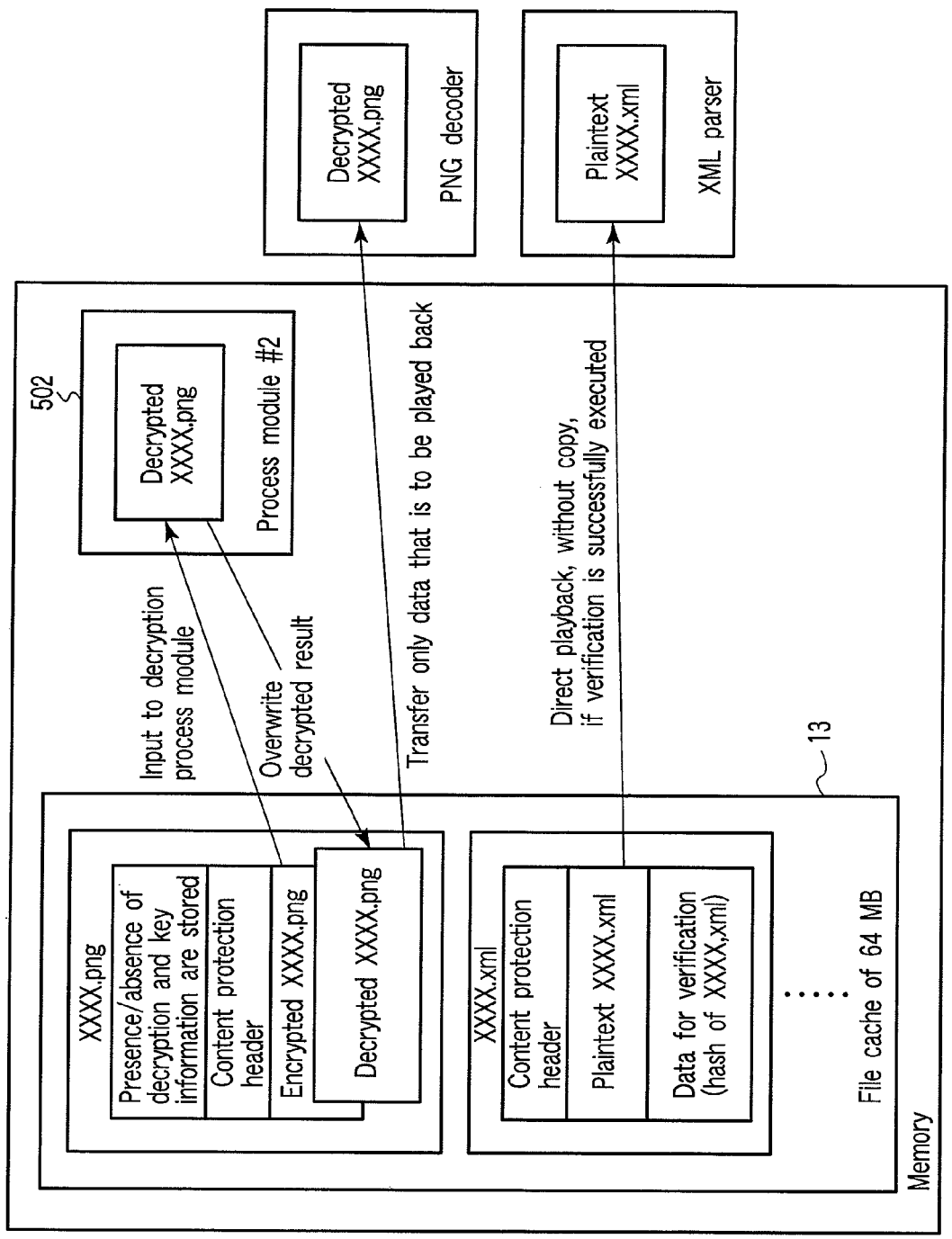
F I G. 7

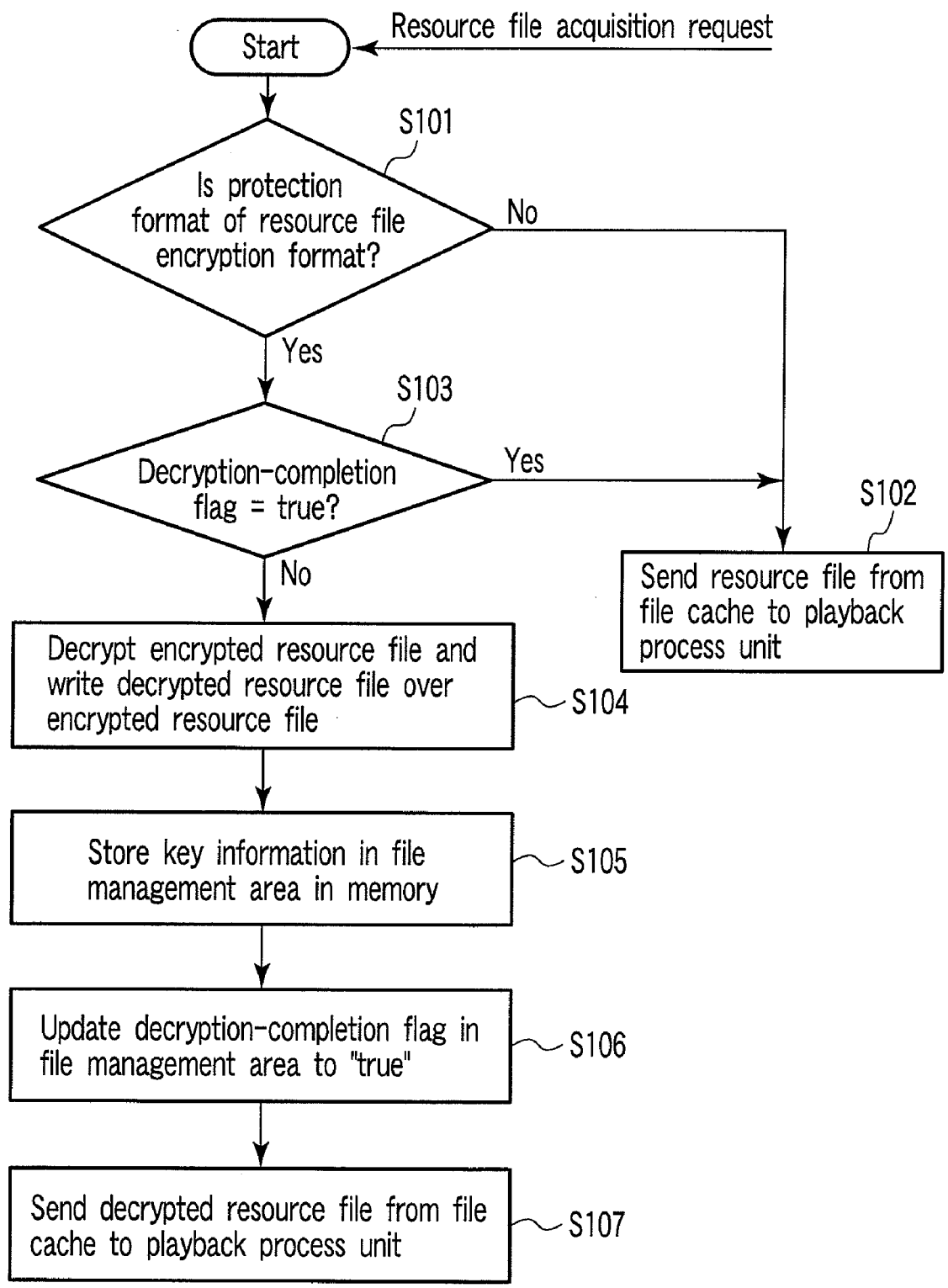
F I G. 9

PLAYBACK APPARATUS AND PLAYBACK CONTROL METHOD

CROSS-REFERENCE TO RELATED APPLICATIONS

This application is based upon and claims the benefit of priority from Japanese Patent Applications No. 2007-264661, filed Oct. 10, 2007; and No. 2008-035267, filed Feb. 15, 2008, the entire contents of both of which are incorporated herein by reference.

BACKGROUND

1. Field

One embodiment of the invention relates to a playback apparatus and a playback method for playing back digital content which is stored in a storage medium.

2. Description of the Related Art

In recent years, with the progress of the digital compression-encoding technology of moving pictures, the development of playback apparatuses (players), which can handle HD (High Definition) standard high-resolution video, has been promoted.

In these players, storage media, such as HD DVDs (High Definition Digital Versatile Discs), are used. By using the storage media such as HD DVDs (High Definition Digital Versatile Discs), it is possible to package HD video data and high-quality surround audio data in a single storage medium.

As a technique for protecting digital content, which is stored in a storage medium, from unlawful copy, there is conventionally known an encryption technique such as CSS (Content Scramble System).

Japanese Patent No. 3162046 discloses a stream of digital content such as video data, in which copy control information is embedded. The copy control information is used in order to realize a copy protection function for restricting copy of digital content such as video data.

In the meantime, recently, in order to enhance the interactivity of digital content, the digital content includes not only a video object such as video data, but also various resource files such as sound effects and image data. The resource files are data for interactively playing back the video object. The video object is encrypted. Similarly, the resource files are encrypted.

Prior to playing back digital content, the respective resource files are loaded from the storage medium into a file cache in the player. A necessary resource file is read out from the file cache and is played back. With use of the file cache, there is no necessity to access the storage medium in order to read out the resource file during the process of reading out the video object from the storage medium.

Normally, each resource file is stored in the file cache in the encrypted state. This enables secure handling of resource files even in such a use case that a copy of each resource file is transferred from the file cache to, for example, a storage device provided in the player.

However, in the case where each resource file is stored in the file cache in the encrypted state, decryption of the resource file is required each time the resource file in the file cache is used. If a buffer area, which is different from the file cache, is prepared, it becomes possible to store each decrypted resource file in the buffer area. However, the use of the dedicated buffer area increases the memory size which needs to be implemented in the player, leading to an increase in cost of the player.

It is necessary, therefore, to realize a novel function of securely handling resource files, without the need to provide a dedicated buffer area.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exemplary block diagram showing the structure of a playback apparatus according to an embodiment of the present invention;

FIG. 7 is an exemplary view for explaining a file cache management process in the playback apparatus according to the embodiment;

FIG. 9 is an exemplary flow chart illustrating the procedure of the file cache management process which is executed by the playback apparatus according to the embodiment;

DETAILED DESCRIPTION

Figure 2:
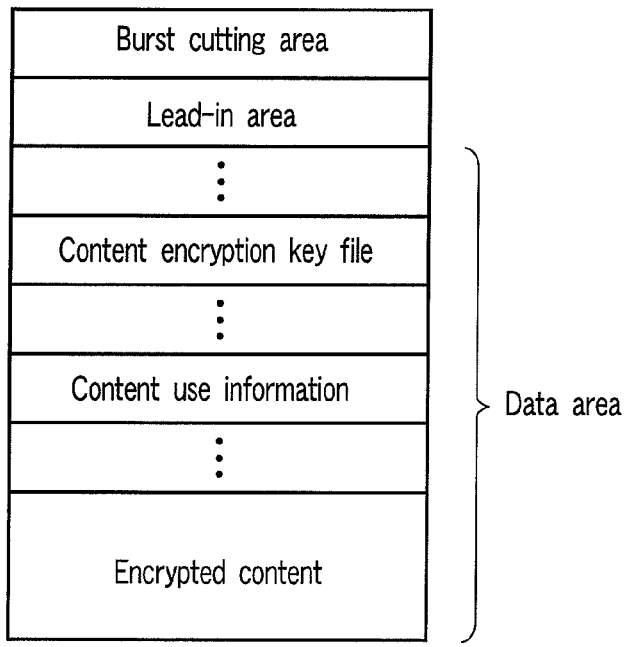
FIG. 2 is an exemplary view showing a physical data structure of a storage medium which is used in the playback apparatus according to the embodiment.

Various embodiments according to the invention will be described hereinafter with reference to the accompanying drawings. In general, according to one embodiment of the invention, there is provided a playback apparatus which plays back digital content including an encrypted video object and an encrypted resource file for interactively playing back the video object, which are stored in a storage medium, including: a memory including a file cache area which temporarily stores the resource file which is read out of the storage medium; a first process module configured to decrypt the video object which is read out of the storage medium; a playback process module configured to play back the decrypted video object and to output a resource file acquisition request for requesting acquisition of the resource file during the playback of the video object; a second process module configured to determine, in response to the resource file acquisition request, whether the resource file stored in the file cache area is decrypted, by referring to management information which is stored in the memory and is indicative of whether the resource file stored in the memory is decrypted or not, to decrypt the resource file if the resource file is not decrypted, to write the decrypted resource file over the encrypted resource file, to update the management information to a value indicative of completion of decryption, and to send the decrypted resource file from the file cache area to the playback process module; and a third process module configured to determine, in response to generation of a copy request for instructing storage of a copy of the resource file in a storage device, whether the resource file stored in the file cache area is decrypted, by referring to the management information, to encrypt, if the resource file is decrypted, the decrypted resource file, to write the encrypted resource file over the decrypted resource file, to update the management information to a value indicative of non-completion of decryption, and to send the encrypted resource file from the file cache area to the storage device.

FIG. 1 shows an example of the structure of a playback apparatus according to the embodiment of the invention. This playback apparatus is a player which plays back digital content that is composed of a data stream such as video data (audio-visual data). This playback apparatus is realized, for example, as an HD DVD player 10 which plays back digital content such as a video title, which is prestored in a storage medium such as an HD DVD (High Definition Digital Versatile Disc). The HD DVD player 10 can play back not only digital content which is stored in an optical disc medium 100 which is a storage medium, but also digital content which is downloaded from a network server via a network such as the Internet.

The HD DVD player 10, as shown in FIG. 1, includes an HD DVD drive 11, a data read module 12, a file cache 13, a content check module 14, a playback process module 15, a network interface 16 and a storage device (also referred as "external storage device") 17.

The optical disc medium (HD DVD medium) 100, which is driven by the HD DVD drive 11, stores encrypted digital content 101, key management information 102 and a content encryption key file 103.

The digital content 101 is audio-visual content such as cinemas and animation. The audio-visual content is a stream in which video data and audio data are multiplexed. Needless to say, audio content, which is composed of audio data alone, may be stored in the optical disc medium 100.

The digital content 101 includes video objects VOB such as an enhanced video object EVOB which is stipulated by the HD DVD standard (a primary enhanced video object P-EVOB or a secondary enhanced video object S-EVOB). The video object VOB is composed of a plurality of video object units VOBU (e.g. a primary enhanced video object unit P-EVOBU and a secondary enhanced video object unit S-EVOBU, which are stipulated by the HD DVD standard). The video object unit VOBU is a data stream corresponding to a predetermined playback time, and includes compression-encoded video data and compression-encoded audio data. Digital content is encrypted in units of a video object unit VOBU such as a P-EVOBU or an S-EVOBU.

Further, the digital content 101 includes some resource files, in addition to the video object VOB such as an enhanced video object EVOB. Each resource file is data that is necessary for interactively playing back the video object VOB. The resource file is composed of, e.g. image data (still images, moving pictures, animation, fonts), sound effects, and scripts. When the digital content 101 is played back, a resource file of, e.g. image data is played back, where necessary, and the image data, etc. is displayed, for example, on a foreground of the video object VOB. As a resource file, also usable is a sub-video object, such as sub-video data, for supplementing the video object VOB.

The resource files and the video object VOB, which are stored in the optical disc medium 100, constitute the digital content 101.

The resource files may also be downloaded from an external network such as the Internet.

The key management information 102 is a data block which provides access to a key (first key) which is unique to a player as a single unit or to a player group. Specifically, the key management information 102 is a data block which permits each player to calculate the first key, which is unique to the player itself or to the player group including this player, by using a set of keys (set of second keys) which are unique to the player itself.

The content encryption key file 103 is a file including some content encryption keys which are encrypted. The content 101 is encrypted by one or more content encryption keys. The one or more content encryption keys are used as key information for decrypting (cancellation of encryption) the content 101.

The set of second keys is secret keys which are assigned to each player, and is different from player to player, or from player group to player group. For example, players which are manufactured by the same manufacturer belong to the same player group.

The set of second keys is prestored in the player 10 when the player 10 is manufactured. The set of second keys, which are possessed by the player 10, is used in order to derive the first key by processing the key management information 102. By decrypting the content encryption key file 103 by the first key, it is possible to obtain a content encryption key which is key information for decrypting the content, 101.

The data read module 12 accesses the HD DVD drive 11 and reads data stored in the optical disc medium 100 (digital content 101, key management information 102 and content encryption key file 103).

The file cache 13 is a cache area for temporarily storing each resource file which is read out of the optical disk medium 100 by the data read module 12. The file cache (also referred to as "file cache area") 13 is realized by a part of the memory area in the memory which is provided in the player 10. The memory size of the file cache 13 is, e.g. 64 MB.

Each of resource files, which are used in playback of the content 101, is loaded in the file cache 13 from the optical disc medium 100 prior to the start of playback of the video object VOB such as the enhanced video object EVOB. Needless to say, resource files, which are downloaded from the external network such as the Internet, may temporarily be stored in the file cache 13. Besides, resource files, which are stored in the external storage device 17, may temporarily be stored in the file cache 13.

On the other hand, the stream of the video object VOB, such as the enhanced video object EVOB, is not stored in the file cache 13. The stream of the video object VOB, which is read out from the optical disc medium 100 by the data read module 12, is sent to the playback process module 15 via the content check module 14.

The content check module 14 is a process module for realizing a copyright protection function, and is disposed between each of the data read module 12 and the file cache 13, on the one hand, and the playback process module 15, on the other hand. The content check module 14 is a module which is configured to be tamper-resistant by a technique such as TRS (tamper-resistant software), and has a function of decrypting an encrypted video object VOB (encrypted primary enhanced video object unit P-EVOBU, encrypted secondary enhanced video object unit S-EVOBU), a function of decrypting each of encrypted resource files, and a function of executing a file cache management process for managing the file cache 13.

In the file cache management process, the content check module 14 decrypts the encrypted resource file which is stored in the file cache 13, and writes the decrypted resource file over the encrypted resource file in the file cache 13. In this case, the content check module 14 executes a process of decrypting the resource file in units of partial data of, e.g. a 128-bit length, and a process of writing the decrypted partial data over the encrypted resource file in the file cache 13. The content check module 14 reads out the decrypted resource file from the file cache 13, and sends the decrypted resource file to the playback process module 15.

In this manner, by writing the decrypted resource file over the same memory area as the memory area in the file cache 13 where the encrypted original resource file is stored, it becomes possible to also keep the decrypted result of the resource file, only with the provision of the file cache 13, and it becomes needless to provide a dedicated buffer for keeping the decrypted result of the resource file.

This file cache management process is executed, for example, in accordance with a resource file acquisition request which is sent from the playback process module 15. If the resource file in the file cache 13, which is requested by the resource file acquisition request, is already decrypted by the content check module 14, the content check module 14 sends the decrypted resource file from the file cache 13 to the playback process module 15. On the other hand, if the resource file in the file cache 13, which is requested by the resource file acquisition request, is not decrypted by the content check module 14, the content check module 14 executes the above-described decryption and overwrite process.

The content check module 14 also includes a function of executing a copy control process for storing a copy of a certain resource file, which is stored in the file cache 13, in a storage device such as the external storage device 17.

In the copy control process, if a to-be-copied resource file is already decrypted, the content check module 14 re-encrypts the to-be-copied resource file, and writes the re-encrypted resource file over the decrypted to-be-copied resource file in the file cache 13. In this case, the content check module 14 executes, in units of partial data of, e.g. a 128-bit length, a process of encrypting the resource file and a process of writing the encrypted partial data over the decrypted to-be-copied resource file in the file cache 13. Then, the content check module 14 reads out the encrypted resource file from the file cache 13, and sends it to the storage device, such as the external storage device 17, that is the destination of storage device.

This copy control process is executed, for example, in accordance with a copy request which is sent from, e.g. a script that is executed by the playback process module 15. This copy request requests that a copy of a certain resource file, which is stored in the file cache 13, be stored in the external storage device 17 or a storage device, such as a network-attached storage (NAS) device, which is connected to the network. If the resource file in the file cache 13, which is designated by the copy request, is encrypted, the content check module 14 sends the encrypted resource file from the file cache 13 to the storage device such as the external storage device 17. On the other hand, if the resource file in the file cache 13, which is designated by the copy request, is already decrypted, the content check module 14 executes the above-described re-encryption and overwrite process.

In the present embodiment, resource files for enhancing the interactivity of video objects can securely be handled by the above-described file cache management process and copy control process, without the need to provide a dedicated buffer area which is different from the file cache 13.

The playback process module 15 executes a playback process for playing back a video object which is decrypted by the content check module 14, and a resource file which is decrypted by the content check module 14. In the playback process, a process of decoding video data included in video object units VOBU, such as a P-EVOBU and an S-EVOBU, and audio data, and a process of decoding resource files are executed.

FIG. 2 shows an example of the physical data structure of the HD DVD medium.

The HD DVD medium is provided with a burst cutting area, a lead-in area and a data area, from the radially innermost part thereof. An encrypted content encryption key file, content use information and encrypted digital content are recorded in the data area. The content encryption key file is composed of a plurality of entries each including an encrypted content encryption key.

Figure 3:
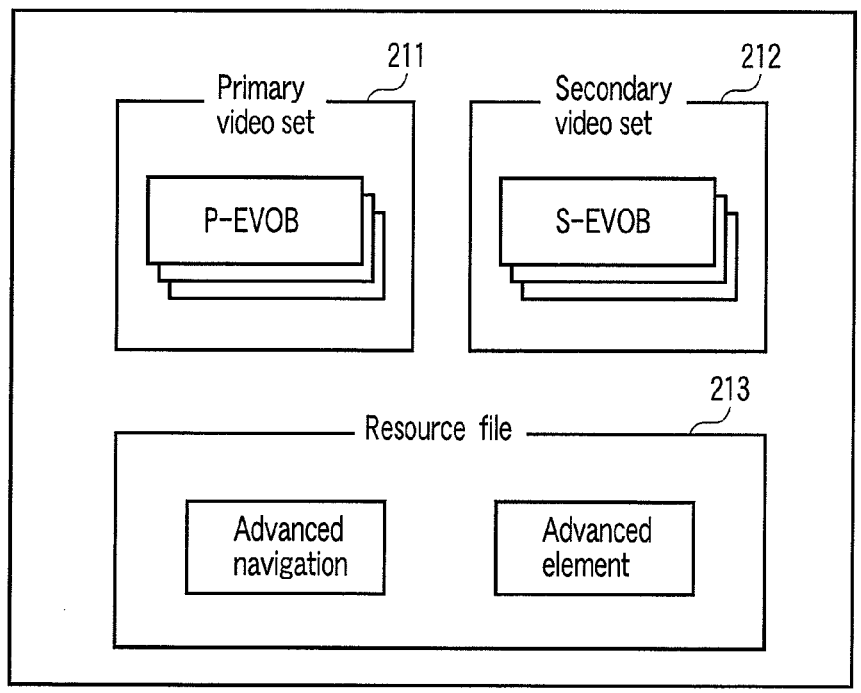
FIG. 3 is an exemplary view showing a structure of content which is played back by the playback apparatus according to the embodiment.

FIG. 3 shows the structure of encrypted digital content.

Encrypted digital content, which includes a primary video set 211, a secondary video set 212 and a resource file 213, can be recorded in the HD DVD medium.

The primary video set 211 is a title set including compression-encoded primary video data and compression-encoded primary audio data, and comprises at least one primary enhanced video object (P-EVOB). In short, the P-EVOB is a primary AV data stream.

The secondary video set 212 is a video set for supplementing the primary video set. The secondary video set 212 is a title set including compression-encoded secondary video data and compression-encoded secondary audio data, and comprises at least one secondary enhanced video object (S-EVOB). In short, the S-EVOB is a secondary AV data stream.

The resource file 213 comprises an advanced navigation and an advanced element. The advanced navigation is navigation data for controlling the playback procedure of digital content, and includes an XML (extensible Markup Language) document and an ECMA (International-European association for standardizing information and communication systems) script. The navigation data includes a description of a playback sequence, a description of a menu, and a description of an action on a menu button. The navigation data includes a play list. The play list includes a description which controls a playback timing of each of the P-EVOB, S-EVOB and resource files, which constitute the digital content 101. In addition, the playlist includes loading information including a description for designating each of resource files which are to be loaded in the file cache 13. When the digital content 101 is played back, the play list is first read from the optical disc 100, and the resource files, which are described in the loading information of the play list, are loaded in the file cache 13 by the data read module 12.

The advanced element is data which is used in order to realize interactive content playback, and is composed of still images, animation, fonts and sound effects.

Figure 4:
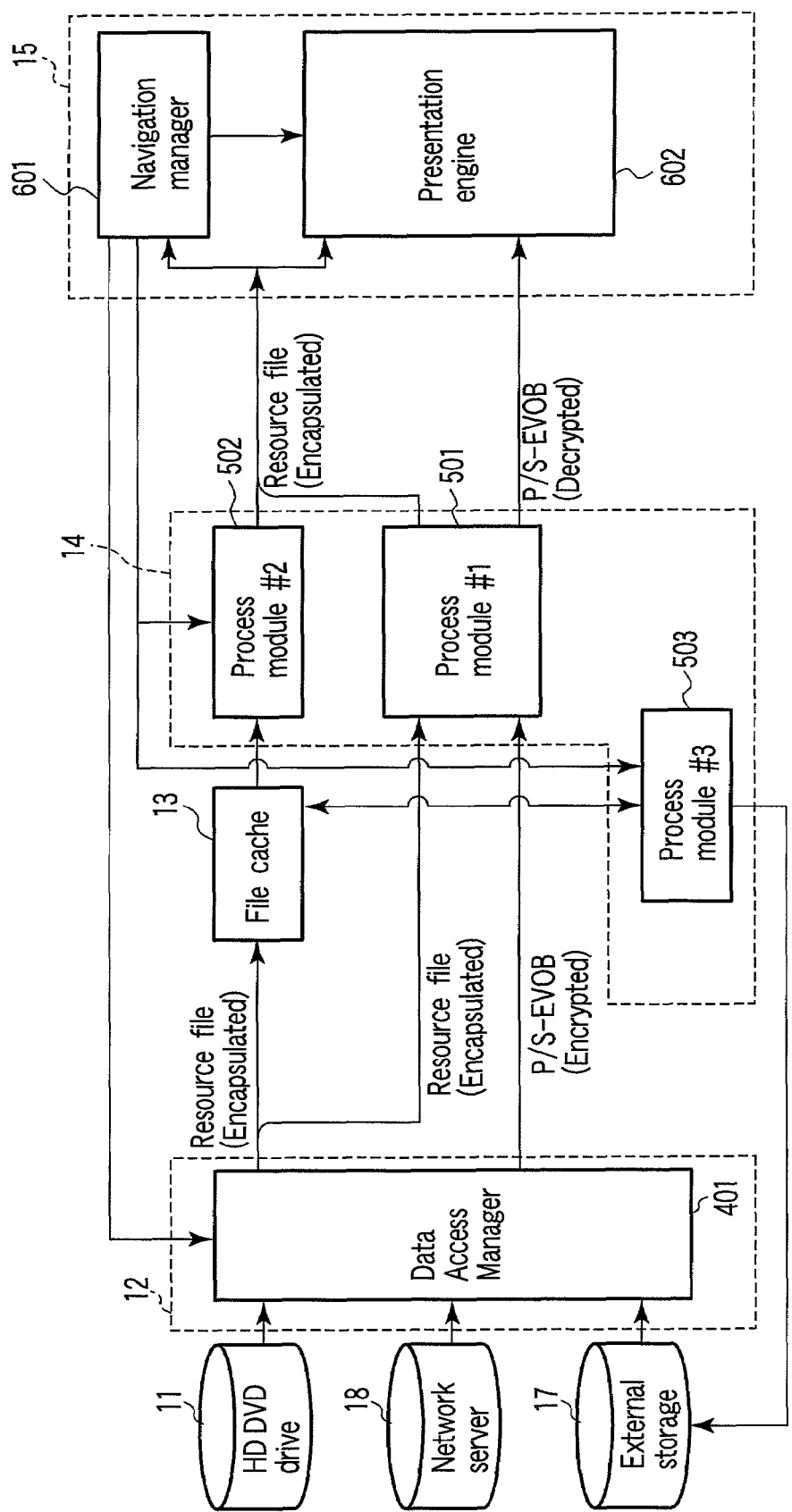
FIG. 4 is an exemplary block diagram showing an example of the functional structure of the playback apparatus according to the embodiment.

Next, reference to FIG. 4, a specific example of the functional structure of the player 10 is described.

The player 10 includes a data access manager 401, a first process module 501, a second process module 502, a third process module 503, a navigation manager 601 and a presentation engine 602.

The data access manager 401 acquires digital content from the HD DVD drive 11, the storage device (persistent storage) 17 such as a nonvolatile memory, or a network server 18 via a network. This data access manager 401 corresponds to the above-described data read module 12.

The first process module 501, second process module 502 and third process module 502 are modules which constitute the above-described content check module 14.

The first process module 501 executes a decryption process for decrypting each stream of the P-EVOB and S-EVOB, and a validity check process for verifying the validity of each stream. The first process module 501 executes a decryption process for decrypting the resource file which is sent from the data access manager 401 not through the file cache 13, and a validity check process for verifying the validity of the resource file.

The second process module 502 executes the above-described file cache management process. The second process module 502 determines, in response to a resource file acquisition request which is sent from the navigation manager 601, whether the resource file, which is stored in the file cache 13 and is requested by the resource file acquisition request, is decrypted or not. This determination process is executed by referring to management information (decryption-completion flag) stored in a file management area which is prepared in the memory that is used as the file cache 13. The management information (decryption-completion flag) is indicative of whether each of resource files stored in the file cache 13 is decrypted or not.

In the case where the resource file, which is requested by the resource file acquisition request, is not decrypted, the second process module 502 decrypts the resource file and writes the decrypted resource file over the encrypted original resource file. The second process module 502 updates the decryption-completion flag to a value indicative of the completion of decryption, and sends the decrypted resource file from the file cache 13 to the playback process module 15.

In the case where the resource file, which is requested by the resource file acquisition request, is already decrypted, the second process module 502 sends the decrypted resource file from the file cache 13 to the playback process module 15.

The third process module 503 executes the above-described copy control process. The third process module 503 determines, for example, in response to a copy request which is sent from the navigation manager 601, whether the resource file, which is stored in the file cache 13 and is requested by the copy request, is decrypted or not. This determination process is executed by referring to the decryption-completion flag corresponding to the resource file which is designated by the copy request.

In the case where the resource file, which is designated by the copy request, is decrypted, the third process module 503 encrypts the resource file and writes the encrypted resource file over the decrypted resource file. The third process module 503 updates the decryption-completion flag, which corresponds to the resource file designated by the copy request, to a value indicative of non-completion of decryption, and sends the encrypted resource file from the file cache 13 to the storage device 17.

On the other hand, in the case where the resource file, which is designated by the copy request, is not decrypted, the third process module 503 sends the resource file from the file cache 13 to the storage device 17.

The navigation manager 601 and the presentation engine 602 function as the above-described playback process module 15. The presentation engine 602 decodes and plays back the stream of the video object (P/S-EVOB), and also decodes and plays back the resource data such as an advanced element in the resource file. The navigation manager 601 interprets the advanced navigation in the resource file, and controls the operation of the presentation engine 602 on the basis of the result of interpretation. In addition, in accordance with the script included in the advanced navigation, the navigation manager 601 executes the process of issuing the above-described resource file acquisition request and copy request.

Next, the file cache management method in the present embodiment is described in comparison with a method of managing the file cache with use of a dedicated buffer area.

Figure 5:
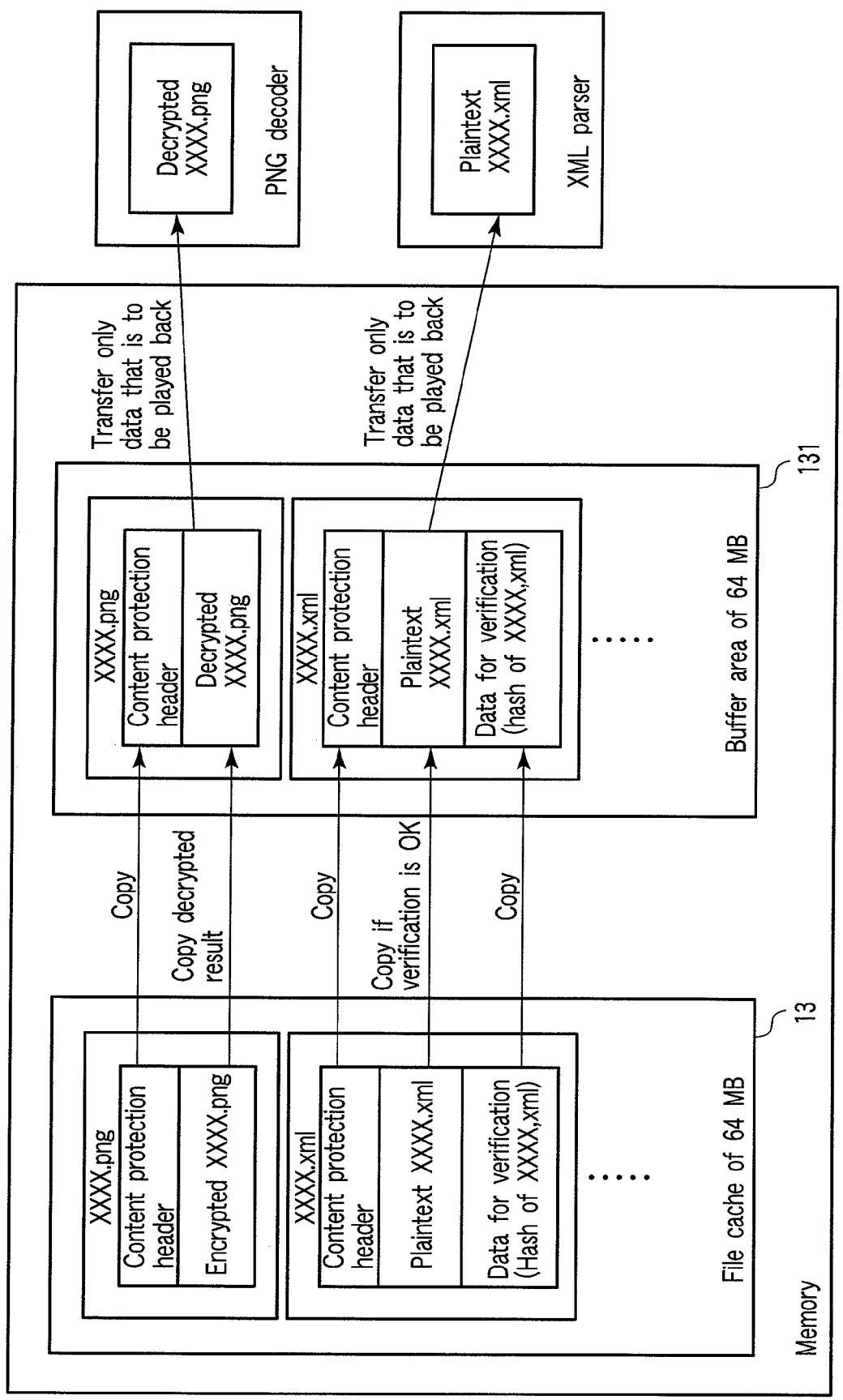
FIG. 5 shows an example of the system configuration in which a file cache management process is performed by using a buffer area which is different from the file cache.
Figure 6:
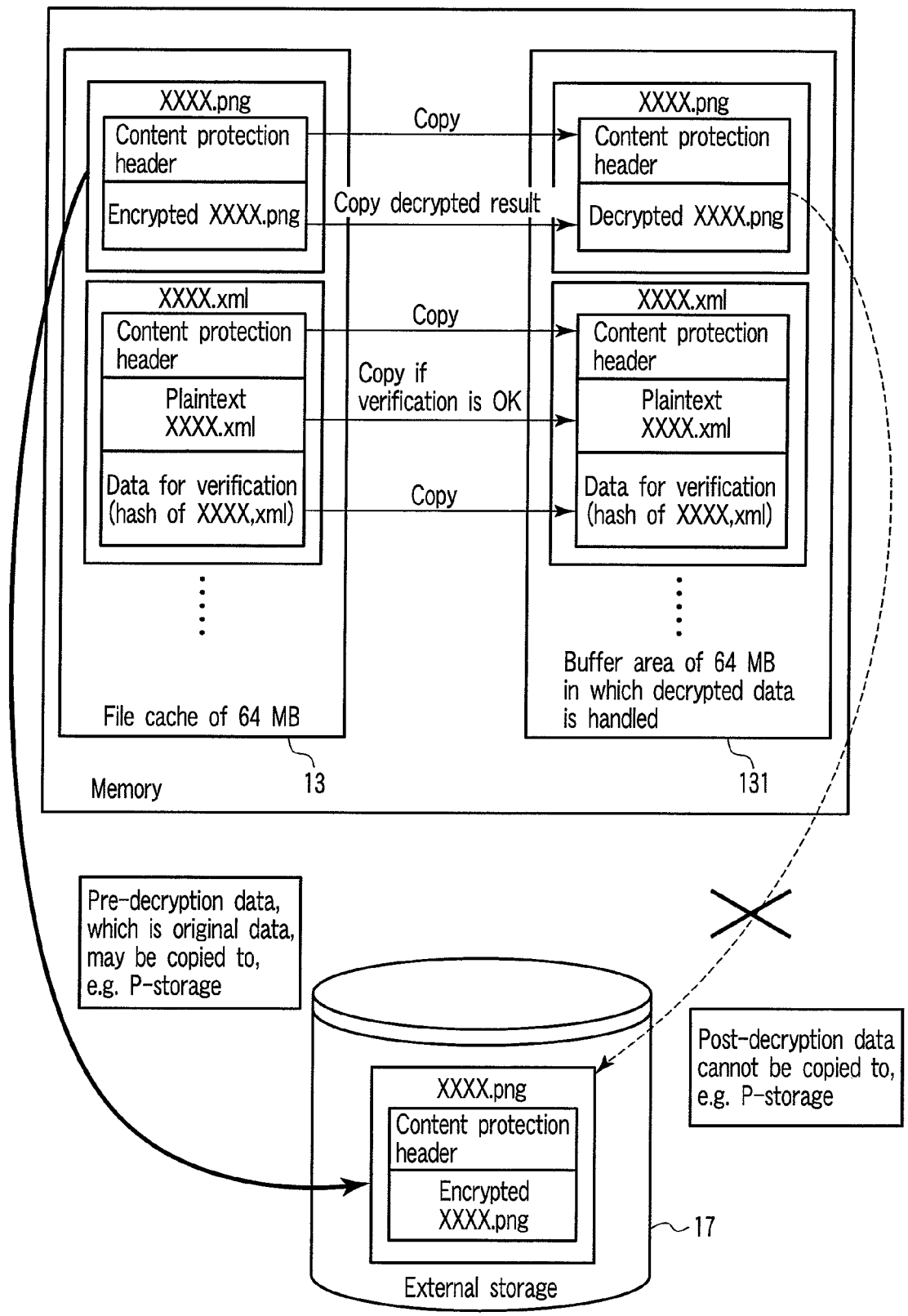
FIG. 6 is an exemplary view for explaining a copy control process which is used in the system configuration shown in FIG. 5.

To begin with, referring to FIG. 5 and FIG. 6, a description is given of an example of the process of managing the file cache 13 by using a dedicated buffer area.

In a system shown in FIG. 5, a dedicated buffer area 131, in addition to the file cache 13, is provided in the memory in the player. Each resource file is protected by one of several kinds of protection formats including encryption, and is loaded in the file cache 13 prior to the start of playback of the digital content 101. The memory size of the buffer area 131 is, e.g. 64 MB, and is the same as the memory size of the file cache 13.

If the playback of the digital content 101 is started, the resource files loaded in the file cache 13 are decrypted, when necessary. At this time, the decrypted resource data is stored in the buffer area 131. Then, the decrypted resource data is sent from the buffer area 131 to components (PNG decoder, XML parser, etc.) in the playback process module 15.

Image data (xxxx.png) and an XML file (xxxx.xml) are stored in the file cache 13 shown in FIG. 5.

The image data (xxxx.png) is protected, for example, by encryption. In this case, the body of the image data (xxxx.png) is encrypted by a predetermined content encryption key. A header (content protection header) is added to the image data (xxxx.png). The header includes a pointer which is indicative of an entry in the content encryption key file, in which a content encryption key corresponding to the image data (xxxx.png) is stored.

The XML file (xxxx.xml) is protected by verification data such as a hash value. The verification data is added to the XML file (xxxx.xml).

As regards the image data (xxxx.png), after the body of the image data (xxxx.png) is decrypted, the image data (xxxx.png) is stored in the buffer area 131. As regards the XML file (xxxx.xml), after the validity of the XML file (xxxx.xml) is confirmed by using the verification data, the XML file (xxxx.xml) is stored in the buffer area 131.

FIG. 6 shows an example of the process of copying a resource file, which is present in the file cache 13, to the external storage device 17 such as a persistent storage (P-storage).

In order to realize content protection, it is required to copy a pre-decryption (encrypted) resource file (original data), and not a post-decryption (decrypted) resource file. Thus, when a copy request is issued, the original data of the resource file, which is designated by the copy request, is read out, not from the buffer area 131, but from the file cache 13, and the read-out original data is stored in the external storage device 17.

However, as described with reference to FIG. 5 and FIG. 6, in the structure using the dedicated buffer area 131, a large memory capacity has to be secured, although the memory management is easy in this case. Thus, this structure is not suited to the implementation of a device, such as a built-in device, in which there are many restrictions to usable memories.

FIG. 7 illustrates the file cache management process of the present embodiment.

The implementation in FIG. 7 is common to that in FIG. 5, up to the step in which each resource file necessary for playback of the digital content 101 is loaded in the file cache 13.

In the present embodiment, use is made of a protection format which involves encryption, and a protection format which involves no encryption (protection format using verification data). The resource file, which is protected by the protection format using verification data, is directly sent from the file cache 13 to the playback process module 15, without executing the above-described decryption process and overwrite process.

As regards the resource file to which the protection format involving encryption is applied, since the data thereof is encrypted, the above-described decryption process and overwrite process are executed. In the system shown in FIG. 5, the decrypted data is stored in the dedicated buffer area 131. By contrast, in the present embodiment, the decrypted data is written over the encrypted original data. Specifically, the encrypted data in the body of the image data (xxxx.png) is successively decrypted by the second process module 502 in units of partial data of, e.g. a 128-bit length. Each time certain partial data is decrypted, the decrypted partial data of the 128-bit length is written in the same address area as the address area of the corresponding original partial data of 128-bit length in the file cache 13.

In addition, the second process module 502 stores, with respect to each encrypted resource data in the file cache 13, the above-described decryption-completion flag which indicates whether the resource data is decrypted or not and the key information for decrypting and encrypting the resource data (the key information being encrypted in a certain manner) in the file management area in the memory that is used as the file cache 13.

Figure 8:
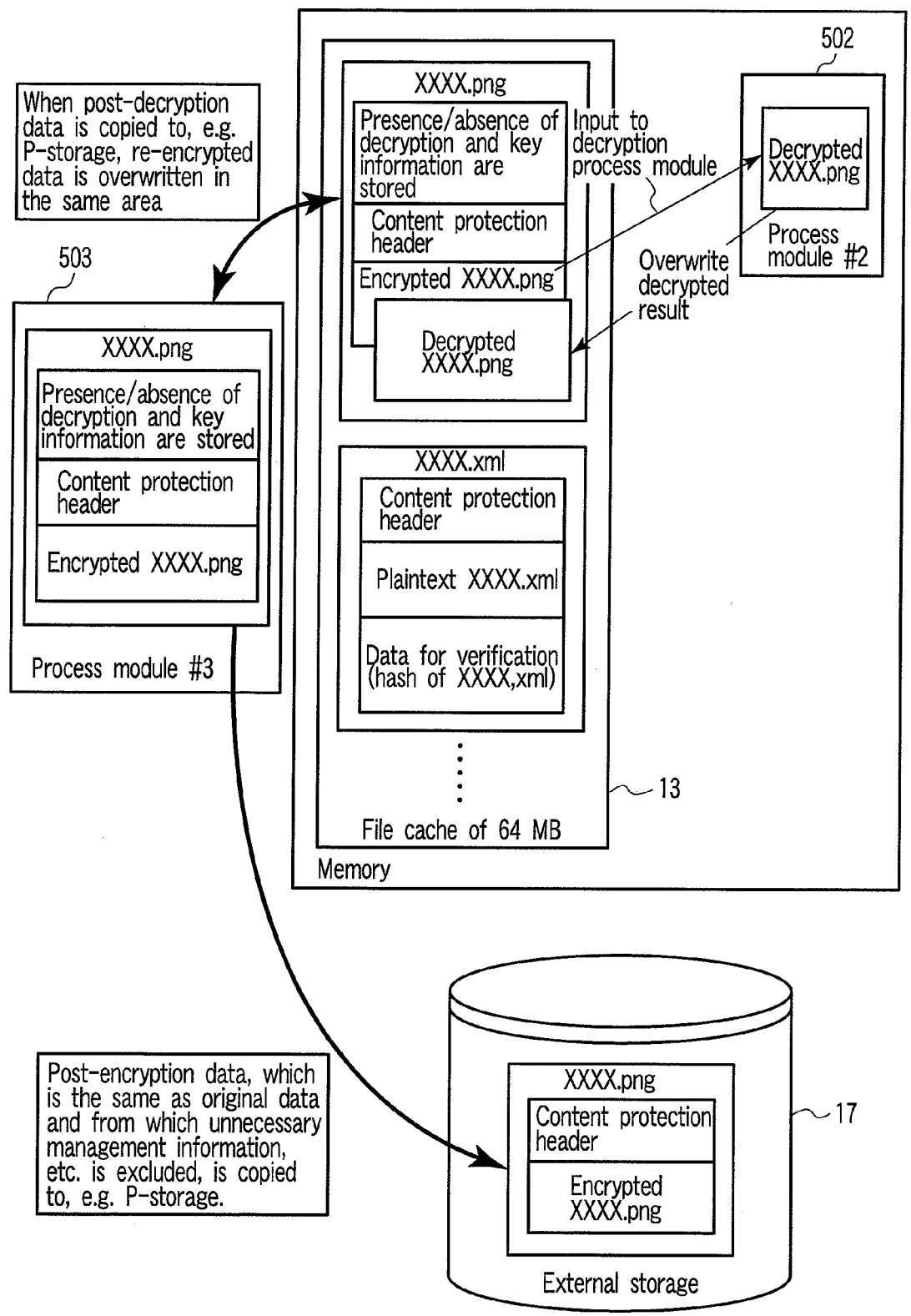
FIG. 8 is an exemplary view for explaining a copy control process in the playback apparatus according to the embodiment.

FIG. 8 illustrates the copy control process according to the present embodiment.

As has been described above, in order to realize content protection, a resource file, which is to be copied to the external storage device 17, is required to be a protected original file. Thus, a copy of the decrypted data cannot directly be stored in the external storage device 17. Accordingly, the third process module 503 determines whether the to-be-copied resource file is decrypted or not, by using two management information items (decryption-completion flag and key information) which accompany the to-be-copied resource file that is designated by the copy request. If the to-be-copied resource file is decrypted, the third process module 503 re-encrypts the decrypted data in the to-be-copied resource file, and writes the encrypted data over the decrypted original data.

For example, if decrypted image data (xxxx.png) in a plurality of resource files stored in the file cache 13 is designated by a copy request, the decrypted data in the body of the image data (xxxx.png) is successively encrypted by the third process module 503 in units of partial data of, e.g. a 128-bit length. Each time certain partial data is encrypted, the encrypted partial data of the 128-bit length is written in the same address area as the address area of the corresponding decrypted partial data of 128-bit length in the file cache 13.

It is not necessary to store the management information, which accompanies the resource file, in the external storage 17. Thus, the third process module 503 deletes the management information from the to-be-copied resource file, and stores only the protected original data in the external storage 17.

By adopting the above-described implementation method, there is no need to provide the buffer area 131, and the cost of the player 10 can be reduced. In addition, since the key information corresponding to the decrypted resource file is stored in the file management area in the memory that is used as the file cache 13, the third process module 503 can easily re-encrypt the to-be-copied resource file, without performing the process of generating the key information corresponding to the to-be-copied resource file.

Next, referring to a flow chart of FIG. 9, a description is given of the procedure of the file cache management process which is executed during the playback process of the digital content 101.

In the playback sequence of the digital content 101, to begin with, prior to the start of playback of the video object in the digital content 101, the playlist is read out from the optical disc 100 and is sent to the navigation manager 601. Under the control of the navigation manager 601, each of necessary resource files is loaded in the file cache 13 by the data access manager 401.

During the playback of the video object, the navigation manager 601 issues a resource file acquisition request for requesting acquisition of a to-be-processed resource file. Each time the second process module 502 receives the resource file acquisition request, the second process module 502 executes the following process.

Specifically, the second process module 502 first selects a resource file from plural resource files stored in the file cache 13, which is requested by the resource file acquisition request, and determines whether the protection format, which is applied to the selected resource file, is a format involving encryption (block S101). If the protection format is not a format involving encryption (NO in block S101), the second process module 502 reads out the resource file, which is requested by the resource file acquisition request, from the file cache 13, and sends the read-out resource file to the playback process module 15 (block S102). The playback process module 15 plays back the resource file that is read out of the file cache 13 by the second process module 502. In this case, in the playback process module 15, if the resource file is an advanced element, this resource file is processed by the presentation engine 602. On the other hand, if the resource file is an advanced navigation, this resource file is processed by the navigation manager 601.

If the protection format, which is applied to the resource file that is requested by the resource file acquisition request, is a format involving encryption (YES in block S101), the second process module 502 refers to the decryption-completion flag corresponding to the resource file that is requested by the resource file acquisition request, and determines whether the resource file is already decrypted or not (block S103).

If the resource file that is requested by the resource file acquisition request is decrypted (YES in block S103), the second process module 502 reads out the decrypted resource file from the file cache 13, and sends the read-out resource file to the playback process module 15 (block S102). The playback process module 15 plays back the resource file that is read out of the file cache 13 by the second process module 502. In this case, in the playback process module 15, if the resource file is an advanced element, this resource file is processed by the presentation engine 602. On the other hand, if the resource file is an advanced navigation, this resource file is processed by the navigation manager 601.

Figure 10:
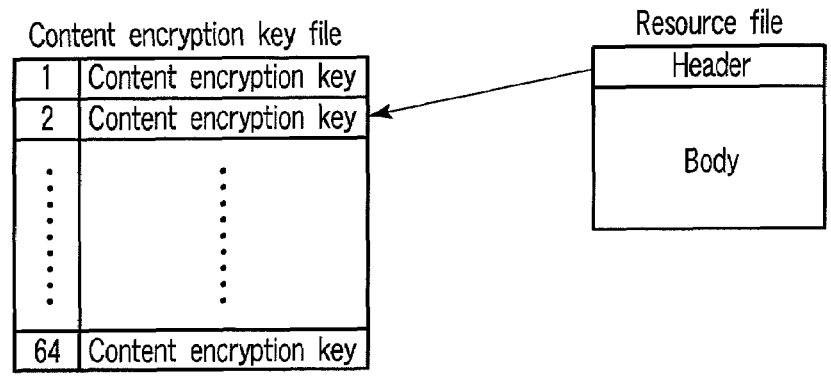
FIG. 10 is an exemplary view for explaining a process of generating key information for decrypting a resource file which is used in the playback apparatus according to the embodiment.

On the other hand, if the resource file that is requested by the resource file acquisition request is not decrypted (NO in block S103), the second process module 502 decrypts the resource file, and writes the decrypted resource file over the encrypted resource file in the file cache 13 (block S104). In this block S104, the content encryption key in the content encryption key file, which corresponds to the requested resource file, is decrypted, and thereby the key information (decrypted content encryption key information) for decrypting the requested resource file is generated. The requested resource file is decrypted by this key information. Specifically, as shown in FIG. 10, a plurality of content encryption keys, which are encrypted, are included in the content encryption key file, and a content encryption key, which is designated by a pointer included in the header of the resource file, is decrypted.

Subsequently, the second process module 502 stores the generated key information in the file management area corresponding to the resource file that is decrypted in block S104 (block S105). Then, the second process module 502 updates the decryption-completion flag, which corresponds to the requested resource file, to a value (=True) indicative of the completion of decryption (block S106). Next, the second process module 502 reads out the requested resource file, i.e. the resource file decrypted in block S104, from the file cache 13, and sends the read-out resource file to the playback process module 15 (block S107). The playback process module 15 plays back the resource file that is read out of the file cache 13 by the second process module 502. In this case, in the playback process module 15, if the resource file is an advanced element, this resource file is processed by the presentation engine 602. On the other hand, if the resource file is an advanced navigation, this resource file is processed by the navigation manager 601.

It should suffice if the process of generating the key information and the process of storing the generated key information in the file management area are executed only in the case where the acquisition of the resource file, which has never been decrypted, that is, the resource file whose corresponding key information is not stored in the file management area, is requested.

Figure 11:
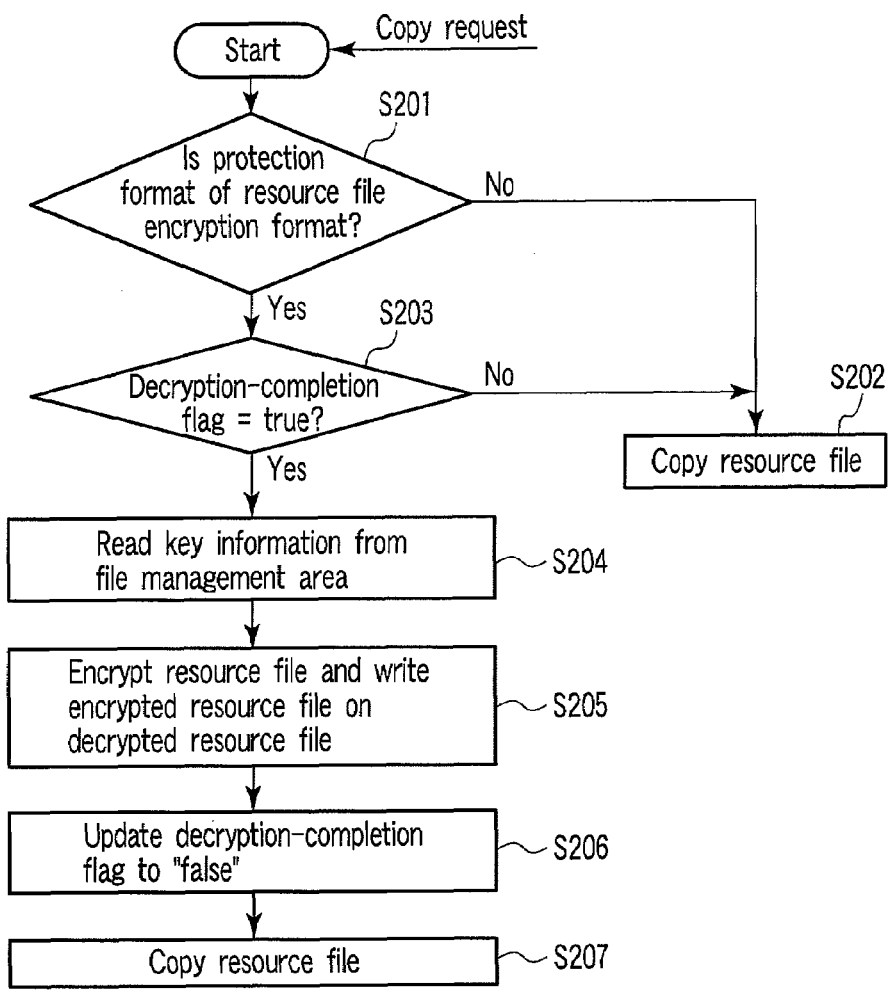
FIG. 11 is an exemplary flow chart illustrating the procedure of the copy control process which is executed by the playback apparatus according to the embodiment.

Next, referring to a flow chart of FIG. 11, the procedure of the copy control process is described.

This copy control process is executed, for example, in a use case in which a copy of the resource file, which is loaded in the file cache 13, is to be stored in the external storage device 17. In this case, the navigation manager 601 generates a copy request, for example, during the playback of the video object or at the time of the end of the playback.

In response to the copy request, the third process module 503 executes the following process.

Specifically, the third process module 503 first determines whether the protection format, which is applied to the resource file that is designated by the copy request, is a format involving encryption (block S201). If the protection format is not a format involving encryption (NO in block S201), the third process module 503 stores a copy of the resource file, which is designated by the copy request, in the external storage device 17 (block S202). In this block S202, the third process module 503 reads out the resource file, which is designated by the copy request, from the file cache 13, and sends the read-out resource file to the external storage device 17.

If the protection format, which is applied to the resource file that is designated by the copy request, is a format involving encryption (YES in block S201), the third process module 503 refers to the decryption-completion flag corresponding to the resource file that is requested by the copy request, and determines whether the resource file is already decrypted or not (block S203).

If the resource file that is requested by the copy request is not decrypted, that is, if the resource file is encrypted (NO in block S203), the third process module 503 stores a copy of the encrypted resource file in the external storage device 17 (block S202).

On the other hand, if the resource file that is requested by the copy request is decrypted (YES in block S203), the third process module 503 reads out the key information, which corresponds to the resource file, from the file management area (block S204). The third process module 503 re-encrypts the resource file, which is designated by the copy request, by using the read-out key information, and writes the re-encrypted resource file over the decrypted resource file in the file cache 13 (block S205).

Subsequently, the third process module 503 updates the decryption-completion flag, which corresponds to the resource file that is designated by the copy request, to a value (=False) indicative of the non-completion of decryption (block S206). Next, the third process module 503 stores a copy of the resource file which is designated by the copy request, that is, a copy of the resource file encrypted in block S205, in the external storage device 17 (block S207). In this block S207, the third process module 503 reads out the resource file, which is encrypted in block S205, from the file cache 13, and sends the read-out resource file to the external storage device 17.

As has been described above, according to the present embodiment, secure handling of resource files is enabled without providing a dedicated buffer area, and thereby the cost of the player can be reduced.

The functions of the player 10 shown in FIG. 1 can all be realized by a computer program. Therefore, simply by installing the computer program in an ordinary computer via a computer-readable memory medium, the ordinary computer can be made to function as a player. In this case, the entire decode process may be executed by software. Alternatively, a part or the entirety of the decode process may be executed by hardware.

The present invention is not limited directly to the above-described embodiment. In practice, the structural elements can be modified and embodied without departing from the spirit of the invention. Various inventions can be made by properly combining the structural elements disclosed in the embodiment. For example, some structural elements may be omitted from all the structural elements disclosed in the embodiment. Furthermore, structural elements in different embodiments may properly be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A playback apparatus configured to play back digital content stored in a storage medium, the digital content comprising an encrypted video object and an encrypted resource file for interactively playing back the video object, the playback apparatus comprising:
   a memory comprising a file cache area configured to temporarily store the resource file read out of the storage medium;
   a first process module configured to decrypt the video object read out of the storage medium;
   a playback process module configured to play back the decrypted video object and to output a resource file request for requesting the resource file during the playback of the video object;
   a second process module configured to determine, in response to the resource file request, whether the resource file stored in the file cache area is decrypted, by referring to management information which is stored in the memory and is indicative of whether the resource file stored in the memory is decrypted or not configured to decrypt the resource file if the resource file is not decrypted, configured to write the decrypted resource file over the encrypted resource file, configured to update the management information to a value indicative of completion of decryption, and configured to send the decrypted resource file from the file cache area to the playback process module; and
   a third process module configured to determine, in response to generation of a copy request for instructing storage of a copy of the resource file in a storage device, whether the resource file stored in the file cache area is decrypted, by referring to the management information, configured to encrypt the decrypted resource file if the resource file is decrypted successfully, configured to write the encrypted resource file over the decrypted resource file, configured to update the management information to a value indicative of non-completion of decryption, and configured to send the encrypted resource file from the file cache area to the storage device
   wherein the resource file is encrypted by specific key information,
   the second process module is configured to generate the key information by decrypting a content encryption key stored in the storage medium corresponding to the resource file, to decrypt the resource file by the generated key information, and to store the generated key information in the memory, and
   the third process module is configured to encrypt the decrypted resource file with the generated key information stored in the memory if the resource file stored in the file cache area is decrypted successfully.

2. The playback apparatus of claim 1, wherein the second process module is configured to send the decrypted resource file from the file cache area to the playback process module if the resource file is decrypted successfully.

3. The playback apparatus of claim 1, wherein the third process module is configured to send the resource file stored in the file cache area to the storage device if the resource file stored in the file cache area is not decrypted.

4. A playback control method for controlling an operation of a playback apparatus configured to play back digital content stored in a storage medium and comprising an encrypted video object and an encrypted resource file for interactively playing back the video object, the method comprising:
   temporarily storing the resource file read out of the storage medium in a file cache area defined in a memory provided in the playback apparatus;
   decrypting the video object read out of the storage medium;
   playing back the decrypted video object by a playback process module in the playback apparatus;
   outputting a resource file request for retrieval of the resource file during the playback of the video object;
   determining, in response to the resource file request, whether the resource file stored in the file cache area is decrypted, by referring to management information which is stored in the memory and is indicative of whether the resource file stored in the memory is decrypted or not;
   executing a decryption process of decrypting the resource file if the resource file is not decrypted, writing the decrypted resource file over the encrypted resource file, updating the management information to a value indicative of completion of decryption, and sending the decrypted resource file from the file cache area to the playback process module; and
   executing a copy control process of determining, in response to generation of a copy request for instructing storage of a copy of the resource file in a storage device, whether the resource file stored in the file cache area is decrypted, by referring to the management information, encrypting, if the resource file is decrypted, the decrypted resource file, writing the encrypted resource file over the decrypted resource file, updating the management information to a value indicative of non-completion of decryption, and sending the encrypted resource file from the file cache area to the storage device
   wherein the resource file is encrypted by specific key information,
   the execution of decryption process comprises generating the key information by decrypting a content encryption key stored in the storage medium corresponding to the resource file, decrypting the resource file by the generated key information, and storing the generated key information in the memory, and
   the execution of the copy control process comprises encrypting the decrypted resource file by the key information stored in the memory, if the resource file stored in the file cache area is decrypted successfully.

5. A program stored in a computer-readable media and configured to cause a computer to play back digital content stored in a storage medium comprising an encrypted video object and an encrypted resource file for interactively playing back the video object, the program comprising:
   causing the computer to temporarily store the resource file read out of the storage medium in a file cache area defined in a memory provided in the computer; causing the computer to decrypt the video object read out of the storage medium;
   causing the computer to play back the decrypted video object, and output a resource file request for requesting retrieval of the resource file during the playback of the video object;
   causing the computer to determine, in response to the resource file request, whether the resource file stored in the file cache area is decrypted, by referring to management information which is stored in the memory and is indicative of whether the resource file stored in the memory is decrypted or not;

causing the computer to decrypt the resource file if the resource file is not decrypted, writing the decrypted resource file over the encrypted resource file, updating the management information to a value indicative of completion of decryption, and reading out the decrypted resource file from the file cache area;

causing the computer to play back the decrypted resource file read out from the file cache area; and causing the computer to execute a copy control process of determining, in response to generation of a copy request for instructing storage of a copy of the resource file in a storage device, whether the resource file stored in the file cache area is decrypted, by referring to the management information, encrypting the decrypted resource file if the resource file is decrypted successfully, writing the encrypted resource file over the decrypted resource file, updating the management information to a value indicative of non-completion of decryption, and sending the encrypted resource file from the file cache area to the storage device wherein the resource file is encrypted by specific key information, the decryption process comprises generating the key information by decrypting a content encryption key corresponding to the resource file, stored in the storage medium, decrypting the resource file by the generated key information, and storing the generated key information in the memory, and the copy control process comprises encrypting the decrypted resource file by the key information stored in the memory if the resource file stored in the file cache area is decrypted successfully.

* * * * *